United States Patent [19]
Andow

[11] Patent Number: 4,484,246
[45] Date of Patent: Nov. 20, 1984

[54] RECLOSING DEVICE FOR TRANSMISSION LINE

[75] Inventor: Fumio Andow, Tokyo, Japan

[73] Assignee: Tokyo Shibaura Denki Kabushiki Kaisha, Kawasaki, Japan

[21] Appl. No.: 265,845

[22] Filed: May 21, 1981

[30] Foreign Application Priority Data

May 31, 1980 [JP] Japan .................. 55-73168

[51] Int. Cl.³ ........................... H02H 7/26
[52] U.S. Cl. ........................ 361/71; 361/67; 361/76; 361/86
[58] Field of Search .............. 361/71, 73, 74, 75, 361/59, 67, 68, 60, 62, 65, 66, 86, 85, 78, 76

[56] References Cited
U.S. PATENT DOCUMENTS 3,312,864  4/1967  Schwanenflugel .......... 361/85 X
3,471,749  10/1969  Harris ...................... 361/59

FOREIGN PATENT DOCUMENTS 1913230  2/1969  Fed. Rep. of Germany .
2355757  5/1974  Fed. Rep. of Germany ........ 361/59
2738654  3/1978  Fed. Rep. of Germany .
47-35741  8/1972  Japan .

Primary Examiner—Patrick R. Salce
Attorney, Agent, or Firm—Oblon, Fisher, Spivak, McClelland & Maier

[57] ABSTRACT

When the positive-phase voltage of one terminal of a transmission line involved in a fault detected by a positive-phase relay exceeds a predetermined value, an output is supplied to the reclosing instructing device from an AND circuit to first reclose this terminal. When it is less than the predetermined value, this terminal is reclosed only if reclosing of the other terminals have been successfully completed.

7 Claims, 11 Drawing Figures

4,484,246

RECLOSING DEVICE FOR TRANSMISSION LINE

BACKGROUND OF THE INVENTION

1. Field of the Invention

The present invention relates to a reclosing device for a three-phase transmission line interrupted by a circuit breaker during a current fluctuation and, more particularly, to a reclosing circuit which recloses a particular terminal of the transmission line in association with the success or failure of reclosing other terminals.

1. Description of the Prior Art

As is well known, a transmission line is broken by a circuit breaker when a fault such as a ground-fault, short-circuiting, or a flashover is caused in the transmission line. When the breaking has been caused by the flashover, for example, power transmission may be continued without any problem upon reclosing the circuit after a predetermined period of time. Therefore, this reclosing is extremely effective for improving the transmission stability and for increasing the quantity of power transmitted. When a fault section is broken and the operation of this section is not restarted, the stability of the power system is lowered. When a second or third fault is caused under this condition, the stability may decay. It is, thus, important with the transmission line to quickly reclose the circuit after the breaking due to the fault. This particularly applies to the case of abnormal weather conditions such as lightning under which faults are liable to happen.

However, a reclosing may not always be accomplished successfully. When the cause of the fault at the place of the fault has not been removed, the fault will happen again immediately after the reclosing, thus breaking the circuit again. When the fault happens again, supply of power through the line in the vicinity of the fault becomes difficult and extreme power instability results. The output of a power generator alters from the rated load to a no-load condition and is then restored to the rated load condition. This causes significant stress between the shafts of the generator and a motor. When the fault happens a second time after the reclosing, the power instability and the stress between the shafts due to the first fault is reinforced by the additional power instability and stress between the shafts. This significantly adversely affects the power system and tends to cause stability decay of the power system, damage due to excessive stress between the shafts and so on.

SUMMARY OF THE INVENTION

The present invention has been made in view of the above and has for its object to provide a reclosing device which is capable of reducing to the minimum the power loss in the vicinity of a fault when the fault happens again upon reclosing of the circuit, and which is capable of significantly eliminating the adverse effect of the fault on the power instability and the stress between the shafts of the generator and the motor.

In order to achieve the above and other objects, the present invention provides a reclosing device according to which a terminal of a three-phase transmission line at which predetermined conditions for the value of the positive-phase voltage during a fault are established (to be referred to as satisfying the voltage conditions hereinafter) is first reclosed, and the terminal at which the voltage conditions have not been satisfied is reclosed only if the other terminals are reclosed and a fault is not again caused due to the reclosing (to be referred to as a successful reclosing).

DETAILED DESCRIPTION OF THE DRAWINGS

This invention can be more fully understood from the following detailed description when taken in conjunction with the accompanying drawings, in which.

DETAILED DESCRIPTION OF THE PREFERRED EMBODIMENTS

The principle of the present invention will be described with reference to FIGS. 1 to 3.

Figure 1:
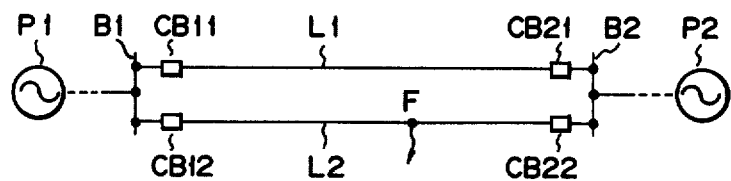
FIG. 1 is a diagram for explaining the principle of the present invention.

FIG. 1 is a view for explaining a fault in a parallel two-circuit transmission line, where L1 and L2 denote three-phase transmission lines, respectively; CB11, CB12, CB21, and CB22 are circuit breakers; B1 and B2 are buses; P1 and P2 are power sources behind the buses B1 and B2; and F is the point of a fault.

Figure 2:
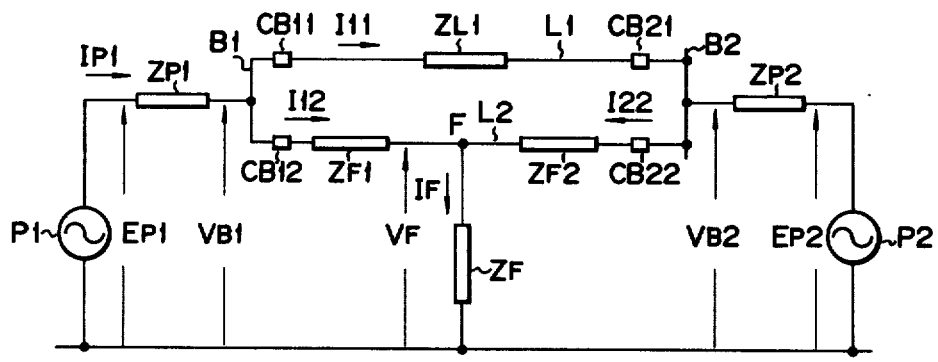
FIG. 2 is a positive-phase equivalent circuit diagram showing the condition when a fault happens in the system of FIG. 1.

FIG. 2 is an equivalent circuit diagram illustrating the positive-phase voltage/current condition of the transmission line shown in FIG. 1. The same reference numerals in the positive-phase equivalent circuit denote the same parts as in FIG. 1. Symbols ZP1, ZP2, ZL1, ZF1, and ZF2 are positive-phase impedances between the bus B1 and the three-phase power source P1, between the bus B2 and the three-phase power source P2, on the transmission line L1, between the circuit breaker CB12 and the point F of the fault, and between the circuit breaker CB22 and the point F of the fault, respectively. ZF is an impedance introduced by the fault which is, as is well known, zero in the case of a three-phase fault (the resistance at the point of the fault is neglegible), a negative-phase impedance in the case of two-phase short-circuiting, a parallel impedance of the negative-phase impedance and the zero-phase impedance in the case of a two-phase ground-default, and a series impedance of the negative-phase impedance and the zero-phase impedance in the case of a one-phase ground-default. These negative- and zero-phase impedances are the impedances of the overall system as viewed from the point of the fault. Voltages EP1, EP2, VB1, VB2 and VF are positive-phase voltages at the power sources P1 and P2, the buses B1 and B2 and the point F of the fault, respectively. Currents I11, I12, I22, IF and IP1 are positive-phase currents at the circuit breakers CB11, CB12 and CB22, the point F of the fault, and the power source P1, respectively. These voltages and currents are represented by their effective values and are expressed as complex numbers.

In the equivalent circuit of FIG. 2, if no fault is present, the impedance ZF is such that the open condition is represented and the voltages VB1 and VB2 are substantially the rated voltage. The phases of the voltages EP1 and EP2 are slightly different and the power is supplied from the advanced phase side to the lagged phase side. When a fault happens at the point F under this condition, the impedance ZF becomes such that the closed condition is represented and the voltages VB1 and VB2 drop. The closer the point F is to B1 (or B2), the smaller is the voltage VB1 (or VB2), and vice versa. These voltages take the smallest values in the case of a three-phase fault and increase in the following order: a two-phase ground-fault, two-phase short-circuiting, and a one-phase ground-fault.

Assume a case wherein a fault happens to break the transmission line, the cause of this fault is not removed after reclosing the line, and the fault happens again. Then, the values of the voltages VB1 and VB2 are equal to those during the fault before reclosing if both the circuit breakers CB12 and CB22 are reclosed. If only one of the circuit breakers CB12 and CB22 is reclosed, the voltage VB1 or VB2 at the reclosed terminal is greater than that during the fault before the reclosing. Thus, referring to FIG. 2, when the circuit breaker CB12 alone is reclosed and the circuit breaker CB22 is not reclosed, the impedance ZF2 is such that the circuit is open there and the positive-phase accident current IF flows through only the impedance ZF1. Therefore, the voltage VB1 is greater than in the case wherein both the circuit breakers CB12 and CB22 are closed.

A case will now be considered wherein the fault happens a second time under the condition that the circuit breaker CB12 alone is reclosed and the circuit breaker CB22 is not reclosed. It is assumed that the positive-phase load current IL1 is flowing between the power sources P1 and P2 before the reclosing of the circuit breaker CB12. The impedances of the generator, the transformer, and the transmission line constituting the recently developed power system are mostly inductance components and include extremely small resistance components. Therefore, for examining by approximation the commercial characteristic frequency, the resistance components of the impedances of FIG. 2 may be neglected. Thus, the following discussion will be made neglecting the resistance components.

Before the reclosing and during the second fault after the reclosing, the power is transmitted between the power sources P1 and P2 through the bus B1, the transmission line L1, and the bus B2. Neglecting the resistance components of the impedances ZP1, ZL1, ZP2, ZF1 and ZF, there is no power loss through these impedances and the power is the same at each point of the power sources P1 and P2 and the buses B1 and B2. At the power sources P1 and P2, the voltage is output in three phases, and the negative-phase and zero-phase voltages are 0. Thus, there is no negative-phase or zero-phase power, so the positive-phase power represents the three-phase power. Since power losses at the respective impedances are neglected, the negative-phase and zero-phase power is 0 and the positive-phase power represents the three-phase power at the other parts of the system as well.

Figure 3:
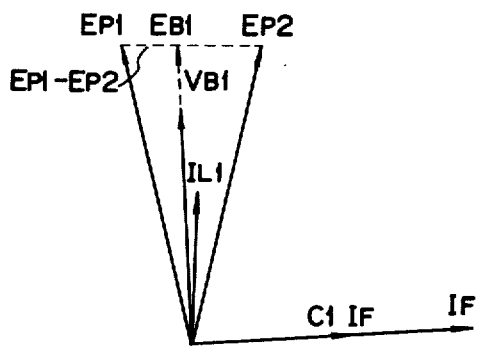
FIG. 3 is a vector representation of the positive-phase voltage/current condition at the time of the fault in the system of FIG. 1.

FIG. 3 shows the voltage/current vectors at each part shown in FIG. 2 before the reclosing and during the second fault after the reclosing. Referring to this figure, EB1 is the positive-phase voltage of the bus B1 before the reclosing and IL1 is the positive-phase load current before the reclosing where it flows in the direction from P1 to P2. When the positive-phase voltages EP1 and EP2 of the power sources P1 and P2 are as shown in the figure, the vectors of the positive-phase voltage EB1 and the positive-phase load current IL1 of the bus B1 before the reclosing become as shown in the figure. Thus, the head of the vector of the voltage EB1 is the head of the vector dividing the difference EP1−EP2 of the voltages EP1 and EP2 by the impedances ZP1 and ZL1+ZP2. Since the respective impedances are considered to include only inductance components, the vector of the current IL1 becomes a vector perpendicular to the vector of the voltage difference EP1−EP2. The power PN before the reclosing may be represented by the following equation:

$$PN = EB1 \cdot IL1 \qquad (1)$$

where EB1·IL1 represents the inner product of the vectors throughout this specification.

When the second fault happens after the reclosing, the positive-phase voltage of the bus B1 drops to VB1 and the fault point positive-phase current IF flows. When the voltage VB1 is obtained with Thévenin's theorem, it is obtained by dividing the voltage EB1 by the respective impedances constituting the circuit of FIG. 2 as follows:

$$VB1 = \frac{ZF + ZF1}{ZF + ZF1 + \frac{(ZL1 + ZP2) \cdot ZP1}{ZP1 + ZL1 + ZP2}} \cdot EB1 \qquad (2)$$

The voltages VB1 and EB1 are of the same phase since the phase angles of the respective impedances of equation (2) are all equal, neglecting the resistance components. The current IF lags the voltage EB1 by 90°. The respective currents in FIG. 2 hold the following relations:

$$I12 = IF \qquad (3)$$

$$IP1 = IL1 + C1IF \qquad (4)$$

where C1 is the shunt ratio of the current IF to the power source P2, which is a real number between 0 and 1 since the phase angles of the respective impedances are equal. The power PF during the second fault after the reclosing is:

$$PF = VB1 \cdot IP1 = VB1 \cdot IL1 + VB1 \cdot C1IF \qquad (5)$$

In equation (5), since C1IF and IF are of the same phase, IF lags EB1 by 90°, and VB1 and EB1 are of the same phase, the phase difference between VB1 and C1F becomes 90°, and VB1·C1IF = 0. Therefore, $$PF = VB1 \cdot IL1 \qquad (6)$$

Since the voltages EB1 and VB1 are of the same phase, from equations (5) and (6), we obtain:

$$\frac{PF}{PN} = \left|\frac{VB1}{EB1}\right| \quad (7)$$

The ratio of the power PF when the second fault happens after the reclosing to the power PN before the reclosing is equal to the ratio of the absolute value of the positive-phase voltage VB1 when the second fault happens after the reclosing of the bus B1 of the reclosed circuit breaker CB12 to the absolute value of the positive-phase voltage EB1 before the reclosing. If the circuit is reclosed only when the absolute value of the voltage VB1 is not so small as compared with the voltage EB1, the change in the power when the second fault happens after the reclosing may be made smaller and the adverse effect on the power instability and stress between the shaft may be reduced to the minimum. Since the absolute value of the positive-phase voltage when the second fault happens after the reclosing never becomes smaller than that of the positive-phase voltage during the fault before the reclosing, the reclosing may be performed under the condition that the positive-phase voltage is greater than a predetermined value during the fault before the reclosing so that another fault may not cause a great power change resulting in power instability and increasing stress between, the shafts of the generator and the prime mover.

Referring to FIG. 2, a case will now be considered wherein both the circuit breakers CB12 and CB22 are reclosed and a second fault happens. It is assumed that the positive-phase load current IL2 flows between the power sources P1 and P2 when the reclosing has been successfully accomplished and a second fault does not occur. The current IL2 is divided into halves and transmitted by the transmission lines L1 and L2. The positive-phase load current before the reclosing is the same as in the case of the reclosing of only the circuit breaker CB12, i.e., IL1.

What has been described with reference to FIG. 3 amounts to saying that the ratio of the power during the fault to the power when there is no fault is approximately equal to the positive-phase voltage drop ratio (|VB1|/|EB1| in FIG. 3) at the point where the positive-phase voltage dropped most in the power transmission line. This approximately applies to the case where both ends of the circuit, that is, the circuit breakers CB12 and CB22, are closed.

The positive-phase voltages at the buses B1 and B2 and the point F under the non-fault condition (when both ends are closed referring to FIG. 2), are represented by EB1, EB2 and EF, respectively. The positive-phase voltages VB1, VB2 and VF at the buses B1, B2, and the point F under the fault condition hold the following relations:

$$|VF| < |VB1| \quad (8)$$

$$|VF| < |VB2| \quad (9)$$

From the above, the ratios of the powers PF1 and PF2 passing through the transmission line L1 and L2 when the second fault happens after reclosing both ends to the powers PN1 and PN2 passing through the transmission lines L1 and L2 when the second fault does not happen after reclosing both ends, is obtained as follows:

$$\frac{PF1}{PN1} = \min\left(\left|\frac{VB1}{EB1}\right|, \left|\frac{VB2}{EB2}\right|\right) \quad (10)$$

$$\frac{PF2}{PN2} = \left|\frac{VF}{EF}\right| \quad (11)$$

The load current IL1 before reclosing and the load current IL2 when the second fault does not happen after reclosing hold the relation:

$$IL2 = (1 \sim 2)IL1 \quad (12)$$

assuming that the difference between the voltages EP1 and EP2 remains constant. Thus, referring to FIG. 2, if $|ZL1| \gg |ZP1+ZP2|$, then IL2=2IL1; if $|ZL1| \ll |ZP1+ZP2|$, then IL2=IL1; in other cases, IL2 is between IL1 and 2IL1.

PN1 and PN2 in equations (10) and (11) correspond to the case when the second fault does not happen after reclosing both ends, and the load currents of the transmission lines L1 and L2 are (IL2/2), respectively. In contrast with this, the load current is IL1 with the power PN before reclosing. Thus, the powers PN, PN1 and PN2 hold the following relation:

$$\frac{PN1}{PN} = \frac{PN2}{PN} = \frac{IL2}{2IL1} = \tfrac{1}{2} \sim 1 \quad (13)$$

Therefore, the powers PF1 and PF2 when the second fault happens after reclosing both ends and the power PN before reclosing hold the relation:

$$\frac{PF1}{PN} = \left[\min\left(\left|\frac{VB1}{EB1}\right|, \left|\frac{VB2}{EB2}\right|\right)\right] \times \frac{IL2}{2IL1} \quad (14)$$

$$\frac{PF2}{PN} = \left|\frac{VF}{EF}\right| \times \frac{IL2}{2IL1} \quad (15)$$

Thus, the ratio of the value PFT, when the second fault happens after reclosing both ends, to the value PN of the power between the power sources P1 and P2 before reclosing may be obtained as follows:

$$\frac{PFT}{PN} = \frac{PF1 + PF2}{PN} = \quad (16)$$

$$\left[\min\left(\left|\frac{VB1}{EB1}\right|, \left|\frac{VB2}{EB2}\right|\right) + \left|\frac{VF}{EF}\right|\right] \times \frac{IL2}{2IL1}$$

If the reclosing at both ends is performed under the condition that the bus voltages VB1 and VB2 when the second fault happens before reclosing is greater than the reference voltage VR, the phenomenon when the second fault happens after reclosing is the same as that when the first fault happens before reclosing. Therefore, neglecting the difference between |EB1| and |EB2|, the ratio of the power PFT when the second fault happens after reclosing to the power PN before reclosing may be expressed as:

$$\frac{PFT}{PN} \geqq \left(\left|\frac{VR}{EF1}\right| + \left|\frac{VF}{EF}\right|\right) \frac{IL2}{2IL1} \quad (17)$$

If it is assumed with reference to relation (17) that the information on the voltage VF at the point F during this fault is not included and at worst VF=0, the ratio of the power PFT to the power PN may be expressed as:

$$\frac{PFT}{PN} \geqq \left|\frac{VR}{EB1}\right| \times \frac{IL2}{2IL1} \quad (18)$$

Thus, the lower limit of the power PFT when the second fault happens after reclosing both ends is limited to $$\left|\frac{VP}{EB1}\right| \times \frac{IL2}{2IL1}$$

with respect to the power PN before the reclosing. Since IL2/IL1 is between ½ and 1, this limit is smaller than the limit when the second fault happens after reclosing only one end. Although the effects of the change in the power are relatively great, they may be smaller than the case where no limit is imposed.

In the basic embodiment of the present invention, the limit of the power change is expressed by equation (18). However, still further measures are taken to eliminate the effects of the power change in the modification of the embodiment of the present invention.

The first embodiment of the present invention will now be described with reference to FIG. 4.

Figure 4:
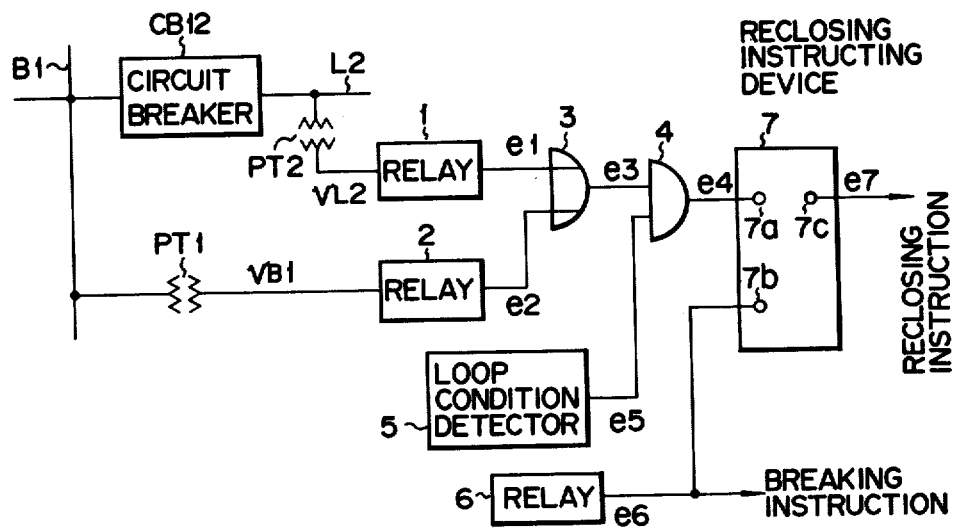
FIG. 4 is a block diagram illustrating a first embodiment of the present invention.

The arrangement in FIG. 4 is for the circuit breaker CB12 in FIG. 1. In FIG. 4, the same reference numerals denote the same parts as in FIG. 1. Referring to FIG. 4, PT1 and, PT2 are potential transformers connected to the bus B1 and the transmission line L2, respectively; 1, a three-phase voltage relay; 2, a positive-phase voltage relay; 3, an OR circuit; 4, an AND circuit; 5, a loop condition detector; 6, a relay; 7, a reclosing instructing device; and 7a, 7b and 7c, terminals thereof.

Voltages vB1 and vL2 proportional to the voltages across the bus B1 and the transmission line L2 are obtained at the secondary winding sides of the potential transformers PT1 and PT2. When the voltage vL2 is healthy in all three phases, the three-phase voltage relay 1 operates and produces an output e1. When the positive-phase component of the voltage vB1 is greater than the reference voltage VR, the positive-phase voltage relay 2 operates after a certain period of time T1 and produces an output e2. When the positive-phase component of the voltage vB1 becomes smaller than the reference voltage VR, the relay 2 is restored to high speed and loses its output e2. The loop condition detector 5 operates and produces an output e5 when both ends of the transmission line part broken by the breaker are connected with the rest of the transmission line, that is, when a loop is established, or when the voltages across both ends are synchronized. The relay 6 operates and produces an output e6 when a fault occurs in the transmission line L2. In response to this output e6, the circuit breaker CB12 breaks the circuit.

When at least one of the outputs e1 and e2 is produced, the OR circuit 3 produces an output e3. When both the outputs e3 and e5 are produced, the AND circuit 4 produces an output e4. The output e6 is applied to the terminal 7b of the reclosing instructing device 7. In response to this output, the reclosing instructing device is started. When the output e4 is applied to the terminal 7a between period T2 after the application of the output e6 and, T3 (where T3>T2), an output e7 is obtained from the terminal 7c. In response to the output e7, the circuit breaker CB12 is instructed to reclose the circuit. When the output e4 is received before the period T2 elapses, the output e7 is not produced until the period T2 has elapsed. After the period T3 has elapsed, the reclosing instructing device 7 is reset. Thereafter, even when the output e4 is received, the output e7 is not produced, so reclosing is not performed. When the output e6 is applied again to the terminal 7b before the period T4 has elapsed after the production of the output e7, the reclosing instructing device 7 is immediately reset and is not restarted.

Figure 5:
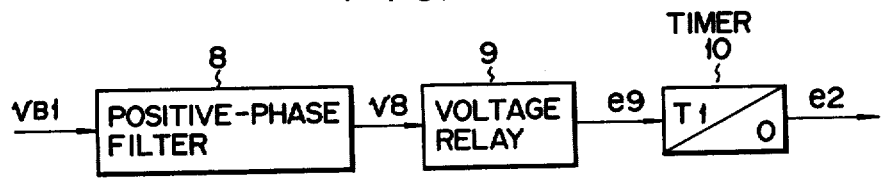
FIG. 5 is a block diagram illustrating an example of the construction of a positive-phase voltage relay.

Since the parts of the loop condition detector 5, the relay 6, and the reclosing instructing device 7 of the construction described above are known and simple, the detailed description thereof will be omitted. FIG. 5 shows an example of the construction of the positive-phase voltage relay 2. Referring to FIG. 5, reference numeral 8 denotes a positive-phase filter, 9 denotes a voltage relay, and 10 denotes a timer. The secondary voltage vB1 of the potential transformer PT1 is supplied to the positive-phase filter, and a voltage v8 proportional to the positive-phase component of the voltage vB1 is produced. When the voltage v8 exceeds a certain value, the voltage relay 9 operates and produces an output e9. In response to the output e9, the timer 10 produces an output e2 after a certain period T1. The output e2 is immediately lost when the output e9 is no longer obtained. With this construction, the positive-phase voltage relay 2 immediately loses the output e2 when the positive-phase voltage VB1 of the bus B1 becomes less than a certain value (this certain value corresponds to a reference voltage VR in this case) and produces the output e2 after the period T1 when it exceeds that value.

Figure 6:
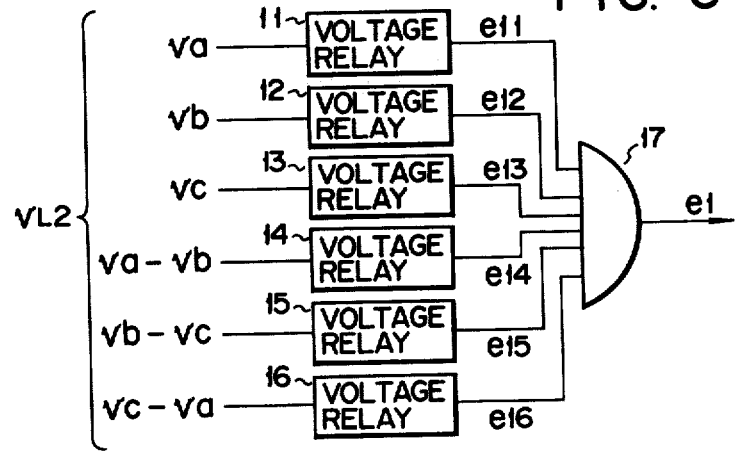
FIG. 6 is a block diagram illustrating an example of the construction of a three-phase voltage relay according to the embodiment of FIG. 4.

FIG. 6 shows an example of the construction of the three-phase voltage relay 1. Referring to FIG. 6, reference numerals 11, 12, 13, 14, 15 and 16 denote voltage relays and 17 denotes an AND circuit. Voltages va, vb and vc of the respective phases a, b and c of the secondary voltage vL2 of the potential transformer PT2, and voltages va−vb, vb−vc, and vc−va between the respective phases are applied to the voltage relays 11, 12, 13, 14, 15 and 16, respectively. When the input voltages are greater than a certain value (a value slightly smaller than the normal value), the voltage relays 11, 12, 13, 14, 15 and 16 operate and produce outputs e11, e12, e13, e14, e15 and e16. When all the outputs e11 to e16 are produced, the AND circuit 17 produces an output e1. With such a construction, when the voltages of all the phases of the transmission line L2 are balanced, the three-phase voltage relay 1 operates and produces the output e1. The response time does not particularly contain a delay.

A device similar to that shown in FIG. 4 is included for the circuit breaker CB22. The limiting period T1 for the positive-phase voltage relay 2 is made longer than the limiting period T3 of the reclosing instructing device 7.

Figure 7:
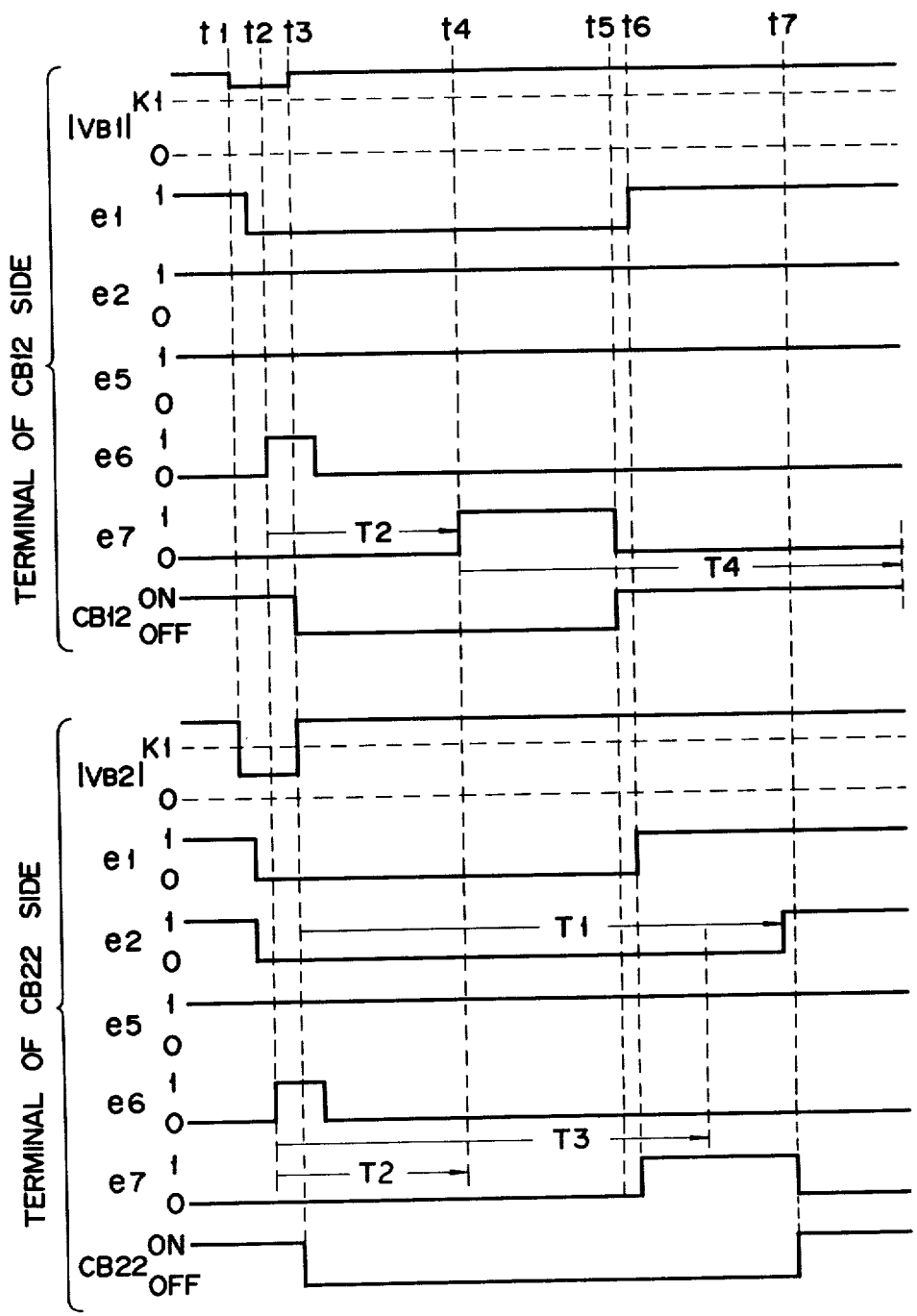
FIG. 7 is a timing chart representing the response of the device shown in FIG. 4.

The mode of operation of the device according to the embodiment shown in FIG. 4 will be described with reference to FIG. 7. FIG. 7 shows a case wherein the drop of the positive-phase voltage VB1 of the bus B1 is relatively small, and the drop of the positive-phase voltage VB2 of the bus B2 is extremely great. It is now assumed that a fault happens at a time t1, the absolute value |VB1| of the voltage VB1 is greater than the constant value K1, and the absolute value |VB2| of the voltage VB2 is smaller than the constant value K1. Thus, the relay 2 continues to operate without being reset at the terminal of the circuit breaker CB12 (to be referred to as the CB12 terminal hereinafter) and e2 is still output. However, at the terminal of the circuit breaker CB22 (to be referred to as the CB22 terminal hereinafter), the relay 2 is reset at a resetting time of the relay 2 from the time t1 and the output e2 is lost. Since the line side voltages drop in the fault at both the circuit breaker CB11 and CB22 terminals, the relay 1 is reset and the output e1 is lost.

At a time t2, the relays 6 operate for both the CB11 and CB22 terminals and outputs e6 are produced. In response to this, the circuit breakers CB12 and CB22 are operated. Although the production of the outputs e6 and the operation of the circuit breakers CB12 and CB22 are performed at slightly different times at both ends, they are shown as performed simultaneously in the figure for the sake of simplicity. At a time t2 when the outputs e6 are produced, the reclosing instructing devices 7 are started at both ends and periods T2 and T3 are measured from this time.

Since the circuit breaking is performed at the time t3, the absolute values |VB1| and |VB2| of the bus voltages are restored at the time t3. Therefore, the relay 2 of the terminal CB22 operates after period T1 has elapsed after the time t3 and produces the output e2. However, the line side voltages of the respective terminals are not restored, so the relays 1 do not operate and the outputs e1 remain unsupplied. The relays 6 of the respective terminals are reset by the circuit breaking and the outputs e4 are lost shortly after the time t3. Since the buses B1 and B2 are connected by the transmission line L1 during the fault and after the circuit breaking, the outputs e5 of both terminals remain output.

Since the outputs e2 and e5 are output at the CB12 terminal at a time t4 which is period T2 after the time t2 at which the reclosing instructing device 7 is started, the output e7 is produced, the circuit breaker CB12 is turned on, and it is closed at a time t5. In this case, the second fault does not occur after the reclosing and the voltage through the transmission line L2 is healthy. Thus, at both ends, the relays 1 operate after a slight delay at a time t6, and the outputs e1 are produced. At the circuit breaker CB22 terminal, neither output e1 nor output e2 is produced at the time t4, and the output e1 is produced at the time t6. Since the output e5 is also produced at this time, and since this time t6 is within the period T3 from the starting time t2 of the reclosing instructing device 7, the reclosing instructing device 7 produces the output e7 and the circuit breaker CB22 is turned on. The circuit breaker CB22 is closed at a time t7, thus completing the reclosing operation. At both ends, the reclosing instructing devices 7 are reset after the period T4 has elapsed after the time at which the outputs e7 are produced and the devices 7 are placed under the holding condition.

When a second fault happens at the time t5 at which the circuit breaker CB12 is closed, the relay 6 operates at the circuit breaker CB12 terminal to produce the output e5 to operate the circuit breaker CB12. Since the time at which the output e5 is produced is within the period T4 from the time t4, the reclosing instructing device 7 is reset and is not restarted. Thus, the circuit breaker CB12 will no longer be reclosed. Then, the voltage of the transmission line L2 will not be healthy when the second fault occurs after the reclosing of the circuit breaker CB12. Thus, at the circuit breaker CB22 terminal, the relay 1 operates so that no output e1 is produced. Even when the absolute value |VB2| of the voltage of the bus B2 when the second fault occurs after reclosing does not become smaller than the certain value K1, the time at which the relay 2 operates to produce the output e2, that is, the time which is period T1 after the time t3, is after the time at which the reclosing instructing device 7 is reset, that is, the time which is period T3 after the time t2. Thus, at the circuit breaker CB22 terminal, the reclosing instructing device 7 is reset so that reclosing is not performed.

If both of the absolute values |VB1| and |VB2| of the positive-phase voltages of the buses B1 and B2 are greater than the certain value K1, the response of the circuit breaker CB22 terminal becomes synchronized with the response of the circuit breaker CB11 terminal of FIG. 7 so that both ends are reclosed without waiting until the other terminals have been successfully reclosed. If both of the absolute values |VB1| and |VB2| are smaller than the certain value K1, the outputs e1 and e2 are not produced until the resetting time (the time which is period T3 after the time t2) of the reclosing instructing devices 7 at both ends has elapsed, so that reclosing is not performed. The certain value K1 need not be the same for both ends, and the responses may be obtained with different values without particular problems.

In summary, according to the embodiment shown in FIG. 4, the terminal for which the predetermined conditions, i.e., that the positive-phase voltages during the fault are above a certain value (which may be the same or different value for each terminal), have been satisfied is reclosed first, and the other terminals are then reclosed only after the successful reclosing of the former terminal, so that the adverse effects when the second fault happens after the reclosing may be reduced to the minimum.

Figure 8:
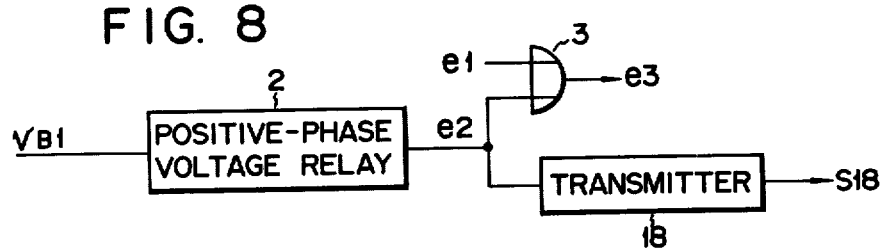
FIGS. 8 and 9 are block diagrams illustrating sedond and third embodiments of the present invention, respectively.
Figure 9:
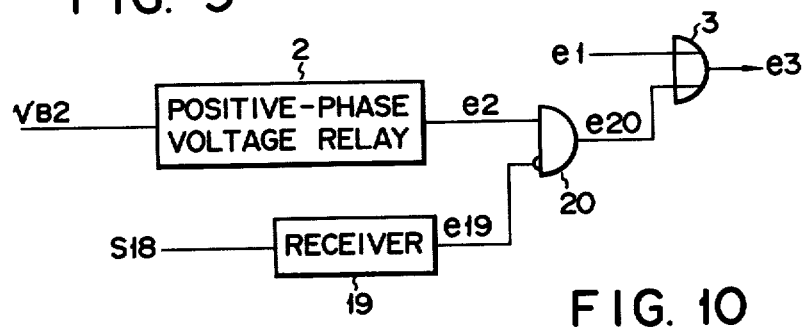

FIGS. 8 and 9 show the second embodiment of the present invention. For the sake of simplicity, only the parts which are different from those of FIG. 4 will be shown. The arrangement shown in FIG. 8 is included for the circuit breaker CB12 terminal, and the arrangement shown in FIG. 9 is included for the circuit breaker CB22 terminal. The same reference numerals denote the same parts as in FIG. 4. Numeral 18 denotes a transmitter, 19 denotes a receiver and 20 denotes an inhibitor. A voltage vB2 is proportional to the voltage of the bus B2.

Referring to FIG. 8, when the output e2 is produced, the transmitter 18 transmits a signal S18. The arrangement in FIG. 8 differs from that shown in FIG. 4 only in that this signal S18 is transmitted. The conditions for reclosing the circuit breaker CB12 terminal are thus the same as those of the arrangement in FIG. 4. Referring to FIG. 9, the signal S18 is applied to the receiver 19. When the signal S18 is received, the receiver 19 produces an output e19. When the output e2 is produced and the output e19 is not produced, the inhibitor 20 produces an output e20. When either of the outputs e20 or e1 is produced, the output e3 is produced. The output e3 is the same as the output e3 of FIG. 4. The arrangement shown in FIG. 9 differs from that shown in FIG. 4 in that the relay 2 for the circuit breaker CB12 terminal operates to produce the output e2 even when the output e2 is produced at the circuit breaker CB22 terminal, the output e3 is not produced when the signal S18 is transmitted, and the output e3 is produced only if the relay 2 of the circuit breaker CB12 terminal is inoperative.

With the construction described above, with the embodiments shown in FIGS. 8 and 9, when the absolute values |VB1| and |VB2| of the voltages of two buses during the fault are greater than the certain value K1, the circuit breaker CB12 terminal alone is reclosed first, and the circuit breaker CB22 terminal is reclosed after the circuit breaker CB11 terminal has been successfully reclosed. The arrangements shown in FIGS. 8 and 9 operate in the same manner as with the embodiment shown in FIG. 4 when the voltages of the two buses are under other conditions.

As in the case of the embodiment of FIG. 4, the certain value K1 need not be the same for both ends.

In summary, according to this embodiment, when there is only one terminal at which the positive-phase voltage during the fault exceeds a certain value, this terminal is reclosed first. When there are a plurality of such terminals, one particular terminal among them is reclosed first, and the other terminals are reclosed after the former terminal has been successfully reclosed, thereby reducing the adverse effects of a second accident after the reclosing. In this embodiment, since the number of terminals which are reclosed under the condition where a second fault may occur after the reclosing is small, the adverse effects of a second fault are further reduced than the case of the embodiment of FIG. 4.

Figure 10:
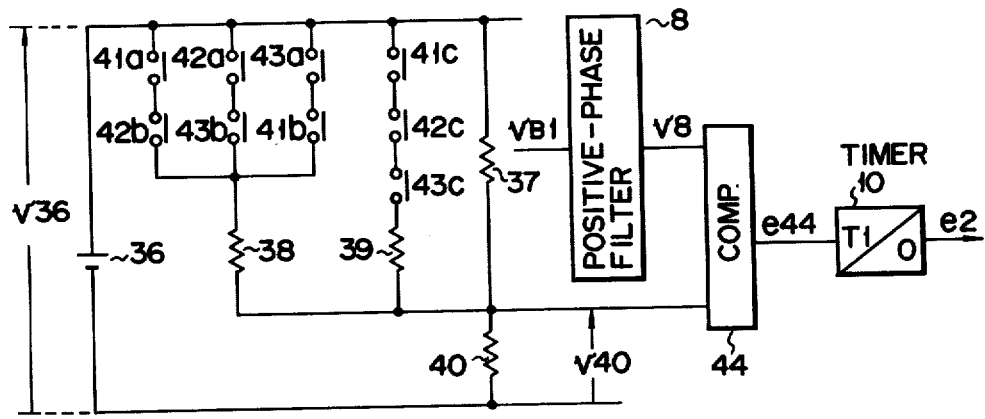
FIG. 10 is a circuit diagram illustrating an example of the construction of a positive-phase voltage relay.

FIG. 10 shows the construction of the positive-phase voltage relay used according to the present invention. This embodiment is of the same construction as that of FIG. 4 except that the relay as shown in FIG. 10 is used in place of the relay 2 of FIG. 4. Referring to FIG. 10, the same reference numerals denote the same parts as in FIG. 5. Referring to FIG. 10, reference numeral 36 denotes a constant voltage DC power source and 37 to 40 are resistors. Numerals 41a, 41b, 41c, 42a, 42b, 42c, 43a, 43b and 43c denote contacts of the relay which respond to a tripping current of the circuit breaker CB12. The contacts 41a, 41b and 41c are closed when the tripping current is in R phase where the three phases are represented as the R, S and T phases, respectively; the contacts 42a, 42b and 42c are closed when the tripping current is in S phase; and the contacts 43a, 43b and 43c are closed when the tripping current is in T phase. Numeral 44 denotes a comparator.

The voltage v36 of power source 36 is applied to a series circuit consisting of the resistors 37 and 40 to provide a voltage v40 across the ends of the resistor 40. When the tripping current of the circuit breaker CB12 flows in any two of the R, S and T phases, one of the series circuits of the contacts 41a and 42b, 42a and 43b, and 43a and 41b is closed so that the resistor 38 is connected in parallel with the resistor 37. When the tripping current flows in all the R, S and T phases, the series circuit of the contacts 41c, 42c and 43c is closed so that the resistor 39 is connected in parallel with the resistor 37.

Thus, when the tripping current flows in three phases, the resistors 38 and 39 are connected in parallel with the resistor 37, and the value v40 is the highest and is represented by K5. When the tripping current flows in two phases, the resistor 38 alone is connected in parallel with the resistor 37, the value of the voltage v40 is smaller than K5 and is represented by K6. In the other cases, neither of the resistors 38 and 39 is connected in parallel with the resistor 37, the value of the voltage v40 is smaller than K6 and is represented by K7. When the voltage v5 proportional to the positive-phase component of the voltage vB1 is greater than the voltage v40, the comparator 44 operates to produce an output e44. The output e44 is applied to the timer 10 as in the case of the output e9 of FIG. 5, and the output e2 of the timer 10 is used as the output of the positive-phase voltage relay 2 of FIG. 4.

In summary, according to this embodiment, the operating voltage of the positive-phase relay is varied depending on the kind of fault before the reclosing, and the predetermined conditions for the positive-phase voltage are varied according to the kind of fault according to the relation: three-phase fault > two-phase fault > one-phase fault. Since the power instability and the stress between the shafts of the generator and the prime mover when the fault happens before reclosing are greater in the order of three-phase fault > two-phase fault > one-phase fault due to the difference in the kind of the fault may, be reduced to the minimum, and the reclosing is continued until these effects exceed the allowable range.

Therefore, the predetermined conditions for the value of the positive-phase voltage during the fault which must be satisfied for reclosing the terminals may vary so that various modifications other than those described herein may be made.

The present invention is thus by no means limited to the embodiments described but may be partially modified in the following manners:

(1) The three-phase voltage relay 1 of FIG. 4 and the embodiment of FIG. 6 are only examples of means for detecting that the reclosing of the other terminals has been successful. Thus, various other modifications may be made. For example, the three-phase insufficient voltage relay shown in the Japanese Patent Publication No. 39-17575 operates when any of the three phases drops. Therefore, it is possible to detect by the inoperative conditions of this relay that the respective phases of the voltage of the transmission line are balanced, and to detect that the reclosing of the other terminals has been successfully terminated. Further, since a synchronization detecting relay operates when the transmission line side voltage is healthy and the phase difference between the transmission line side voltage and the bus side voltage is within a certain phase angle, it is possible to detect the successful reclosing of the other terminals by the operation of such a relay.

Detection of the successful reclosing of the other terminals need not always utilize the transmission line side voltage. For example, it is possible to detect that circuit-breaking is not performed within a certain period of time after the reclosing of the other terminals, and to transmit a signal thereafter.

(2) The present invention may be used in combination with other reclosing means. For example, reclosing may not be accomplished with the embodiment of FIG. 4 when there is no terminal at which the output e2 is obtained upon the operation of the relay 2. However, when a low-speed reclosing means is combined therewith according to which the reclosing is performed after a long period of time so that the phenomenon due to the power instability and the stress between the shafts of the generator and the motor after the breaking has settled, the broken transmission line may be returned to the normal condition. Although the advantage for a stable power system is slight with the low-speed reclosing, the operation may be advantageously restored automatically.

With the reclosing system according to which only the phase involved in the accident among the three phases is broken and reclosed, when the reclosing is not performed for some reason and the operation continues with the three phases unbalanced for a certain period of time, the unbroken phases can be broken. When a second fault happens after the reclosing, all three phases can also be broken regardless of which one is involved in the fault. It is to be understood that this breaking system may also be combined with the means of the present invention.

(3) The present invention is applicable not only to a two-terminal transmission line but also to a multi-terminal transmission line having three or more terminals. In this case, the present invention may be applied to some of the terminals of the multi-terminal transmission line, with the other terminals not being reclosed. Alternatively, these remaining terminals may be reclosed under the condition that the terminals to which the present invention is applied have been successfully reclosed.

Any embodiment of the present invention may easily be applied to a plurality of terminals exceeding 3 in number. The embodiment shown in FIG. 4 may be applied without modification to the case of multiple terminals.

The embodiment shown in FIGS. 8 and 9, according to which a particular terminal is closed prior to others under the condition that the positive-phase voltages during the fault for a plurality of terminals exceed the certain value, may be applied to the multi-terminal transmission line with slight modification by numbering the terminals according to priority and reclosing one terminal first according to this order of priority when the predetermined conditions have been satisfied at a plurality of terminals.

Since the above measures may easily be taken employing known means in a simple manner, the detailed description thereof will be omitted. Any of the above means may be adopted for the multi-terminal transmission line to eliminate the adverse effects of a second fault after reclosing.

(4) In the embodiments described above, for detecting whether or not the value of the positive-phase voltage during the fault at the transmission line terminal is greater than the certain value, the minimum value of the bus side positive-phase voltage across the transmission line terminal before and after the breaking of this terminal is used. This is because the minimum value of the bus side positive-phase voltage is equal to the value of the positive-phase voltage of the transmission line terminal involved in the fault to which the former transmission line is connected, so that it is not particularly necessary to detect whether the former transmission line is involved in the fault. However, when detecting the transmission line side voltage of the transmission line terminal during the fault, the value greatly decreases after the breaking at the terminal so that the value during the fault cannot be detected with this means.

Figure 11:
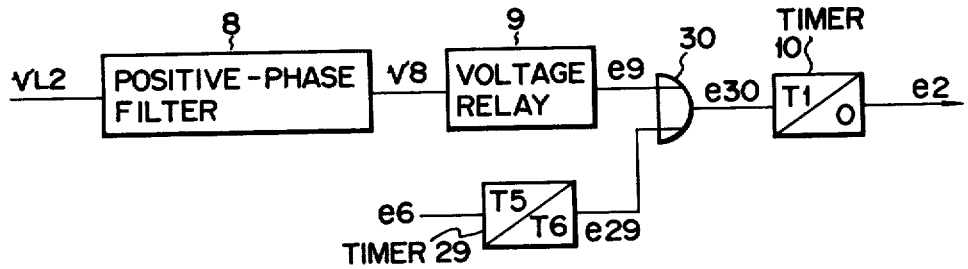
FIG. 11 is a block diagram illustrating another example of the construction of the positive-phase voltage relay.

FIG. 11 shows a construction of a positive-phase voltage relay to overcome these problems, which may be used in a similar manner as the relay 2 shown in FIGS. 4, 8 and 9, except that the transmission line side voltage vL2 is used in place of the bus side voltage vB1 of FIG. 4. In FIG. 11, the same reference numerals denote the same parts as in FIGS. 4 and 5, 29 denotes a timer, and 30 denotes an OR circuit. When the voltage vL2 is supplied to the positive-phase filter 8 to produce the voltage v8 proportional to its positive-phase component, the voltage relay 9 produces the output e9 if the voltage v8 is over a certain value. When the relay 6 outputs a breaking instructing output e6, the timer 29 produces an output e29 after the period T5. When the output e6 is no longer present, the output e29 is lost after the period T6 has elapsed. When either of the outputs e9 or e29 is present, the OR circuit 30 produces an output e30 which is applied to the timer 10 as in the case of the output e9 of FIG. 5. The output e2 of the timer 10 is used in the same manner as the output e2 of FIG. 5.

In the above embodiments, the period T5 is a period of time which is slightly shorter than the minimum breaking period of the circuit breaker tripped by the output e6. However, when the relay which produces the output e6 is not of high-speed type and the operation time may not be less than one cycle, the period T5 may be made 0. The period T6 is a period which is longer than the period T2 and which is sufficiently shorter than the period T1.

The mode of operation of the positive-phase relay shown in FIG. 11 will be described. When the voltage v8 proportional to the positive-phase voltage VL2 of the line side of the breaker CB12 is obtained and the absolute value $|VL2|$ of the voltage VL2 is greater than the certain value K1, the output e9 is produced. When the value $|VL2|$ drops in the fault, the output e9 is produced until the breaker CB12 breaks the circuit if the value during the fault is greater than K1. When the breaker CB12 breaks the circuit, the absolute value $|VL2|$ of the positive-phase voltage drops and becomes smaller than the certain value K1, and the output e9 is lost. However, before the circuit-breaking, the output e29 is produced by the output e6 instructing breaking operation of the circuit breaker CB12. Since this output e29 is produced during the period T6 after the loss of the output e6, the output e2 is not lost during this period. Since the period T6 is longer than the period T2 required for the reclosing device 7 to produce the output e7 (reclosing instructing output) after the production of the output e6 and since the output w2 is present during the period T2, the reclosing operation according to the order of priority is performed as in the case of the embodiment shown in FIG. 4.

When the absolute value $|VL2|$ of the positive-phase voltage during the fault is smaller than the certain value K1, the output e9 is lost until the output e29 is produced. In response to this, the output e30 is lost, the timer 30 is reset, and the output e2 is lost. Although the output e6 is produced thereafter, this output e6 is lost simultaneously with the breaking of the circuit breaker CB12. Therefore, the continuous time of the output e29 is only slightly longer than the period T6 and is sufficiently shorter than the operating period T1 of the timer 10. Therefore, the production of the output e30 by the output e6 does not result in the operation of the timer 10 and hence in the production of the output e2. By the loss of this output e2, the reclosing according to the order of priority is not performed.

Thus, according to the construction shown in FIG. 11, it is possible to detect whether or not the positive-phase voltage during the fault of the transmission line terminal is greater than the certain value using the transmission line side voltage of the transmission line terminal. This example is only a means for detecting whether or not the value of the positive-phase voltage during the fault of the transmission line terminal satisfies the predetermined conditions, and various other modifications may be made.

(5) The positive-phase filter 8 and a voltage relay which responds to the output therefrom were used for detecting whether or not the value of the positive-phase voltage satisfied the predetermined conditions in the above embodiments. However, such a construction is not an essential part of the present invention. Thus, it is possible to adopt a means for detecting whether or not the value of the positive-phase voltage satisfies the predetermined conditions, which does not use such a construction.

For example, it is possible to sample and store the instantaneous values of the respective three phases at a predetermined time interval (e.g., 30°), to calculate the positive-phase voltage with a computer using the stored values, and to judge whether or not these values satisfy the predetermined conditions.

In summary, the present invention provides a reclosing device according to which even when a second fault happens after the reclosing, the adverse effects of power instability and stress on the generator shaft may be minimized, and the instability decay and damages to the generator may be prevented.

What is claimed is:

1. A reclosing device for a transmission line comprising:
   first means for obtaining a positive-phase voltage of a transmission line terminal involved in a fault with said transmission line having other terminals;
   second means for judging whether or not said positive-phase voltage exceeds a predetermined value during the fault;
   third means for judging whether or not reclosing of the other terminals of said transmission line have been successfully performed;
   fourth means for, when said predetermined value is judged by said second means to have been exceeded, reclosing said transmission line terminal; and
   fifth means for, when said predetermined value is judged by said second means not to have been exceeded, reclosing said transmission line terminal only if said other terminals are judged by said third means to have been successfully reclosed.

2. A reclosing device according to claim 1, wherein said predetermined value may be the same or different for each terminal.

3. A reclosing device according to claim 1, wherein said predetermined value is the same or different for each terminal, and wherein said predetermined value for only a particular terminal are considered to have been satisfied when said positive-phase voltage value at a plurality of terminals is more than said predetermined value.

4. A reclosing device according to claim 1, wherein said predetermined value is varied according to the kind of the fault.

5. A reclosing device according to claim 1, wherein said second means is adapted to judge whether or not a positive-phase voltage obtained immediately before an interruption of said transmission line terminal exceeds the predetermined conditions.

6. A reclosing device according to any of claims 1 to 5, wherein said first means includes a positive-phase voltage relay, a multi-phase voltage relay, an OR gate connected to receive outputs of said positive-phase voltage relay and said multi-phase voltage relay, an AND gate having a first input connected to an output of said OR gate and a second input, a loop condition detector for supplying an output to said second input when both ends of a transmission line broken by a breaker are connected with the rest of the transmission line, a fault relay for producing an output when a fault occurs, and a reclosing instruction device for generating a reclosing instruction in response to output of said AND gate and said fault relay.

7. A reclosing device according to any one of claims 1 to 5, wherein said first means includes a positive-phase filter for producing a first voltage proportional to a positive-phase component of a transmission line side voltage, a voltage relay for producing breaking output when said first voltage is over a certain value, a first time adapted to produce a timer output in response to said breaking output, and a second timer for producing a positive-phase voltage relay output in response to both outputs of said voltage relay and said first timer.

* * * * *